July 1, 1930.  N. A. HALLWOOD  1,769,780
SCALE
Filed March 13, 1928  2 Sheets-Sheet 1
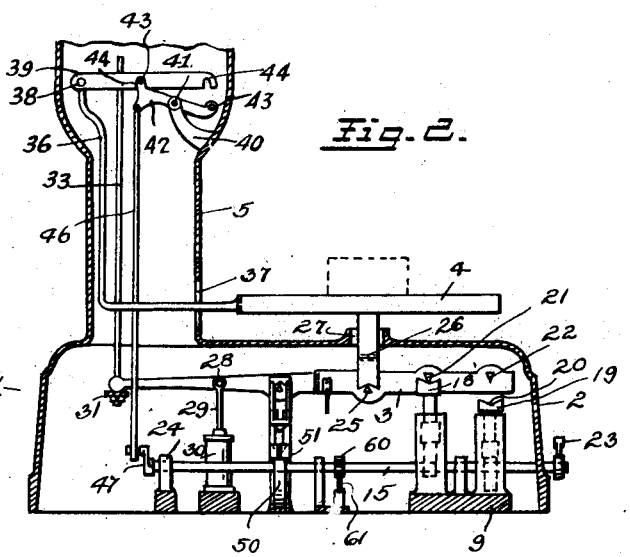
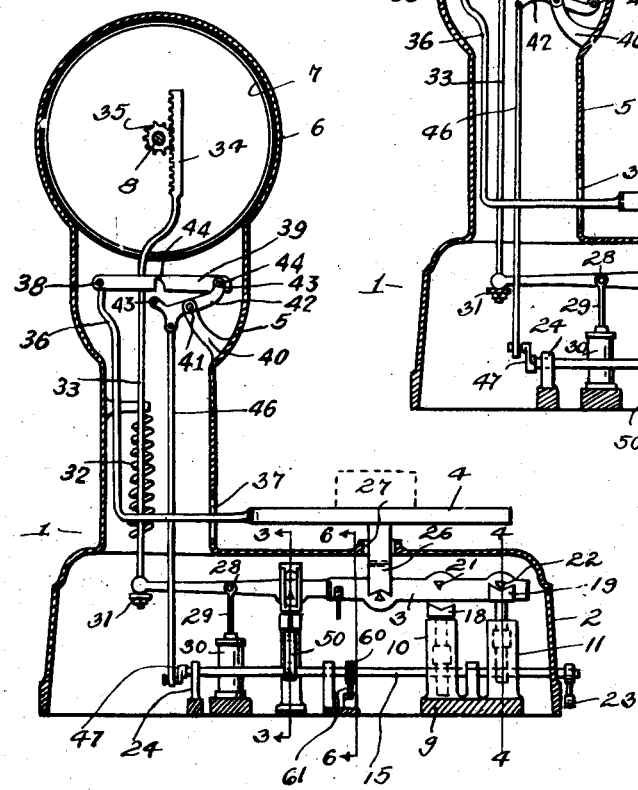
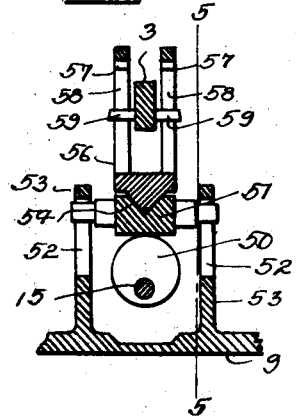
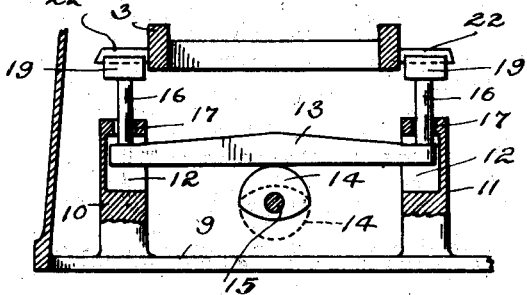
Inventor
N. A. Hallwood
By *H. S. McDmel*
Attorney July 1, 1930.   N. A. HALLWOOD   1,769,780
SCALE
Filed March 13, 1928   2 Sheets-Sheet 2
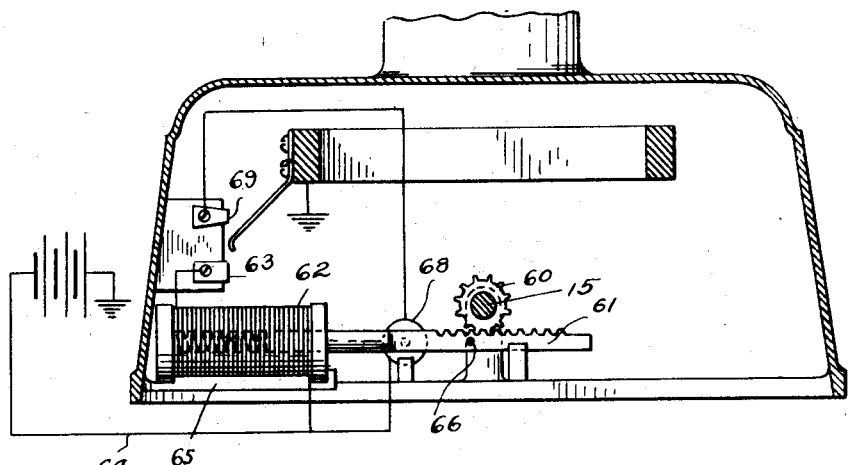
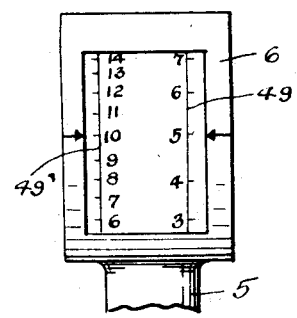
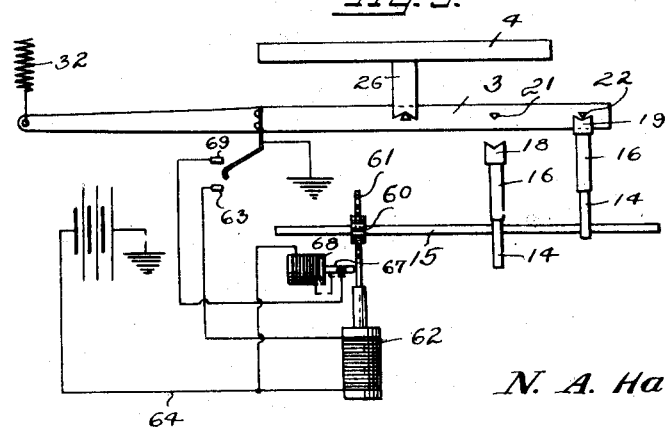
Inventor
N. A. Hallwood
By W. S. McDowell
Attorney Patented July 1, 1930

1,769,780

UNITED STATES PATENT OFFICE

NATHAN A. HALLWOOD, OF COLUMBUS, OHIO

SCALE

Application filed March 13, 1928. Serial No. 261,360.

This invention relates to weighing scales and is especially directed to the provision of an improved scale embodying features by which the weighing limit or capacity of the scale may be changed or varied to provide for convenience in weight reading and also to enlarge the weighing limit of the scale.

Another object of the invention resides in providing a scale which constitutes an improvement upon the disclosures contained in my co-pending application for weighing scales, filed February 8, 1926, Serial Number 86,787.

In the aforesaid application a scale construction is set forth involving a weighing beam having a plurality of pivots for fulcrum positions together with a manually operated means for selectively regulating said positions in order to adapt the scale to a plurality of weighing ranges, there being a low range position to permit of the weighing of the vast majority of articles placed on the scale and a so called high range weighing position to permit of the weighing of articles of greater bulk but which constitute but a small minority of the total number of articles usually weighed on the scale, the beam of the scale being resiliently supported and having its free end connected with a weight indicating mechanism, whereby the extent of deflection of the beam from a normal or neutral position may be observed.

It is an outstanding object of the present invention to provide in a scale of the above character an improved means by which the working balance of the beam and the influence thereof on the weight indicating mechanism may be maintained uniform regardless of the fulcrum position of support of the beam, in order that when the effective length of the beam is shortened an additional weight means is applied to the outer or free end of the beam so as to compensate for the inactive overhanging pivotal end of the beam.

Another important object of the invention resides in the provision of a scale of the above character wherein the weighing ranges of the scale are varied automatically in accordance with the weight of the body placed on the weight receiver of the beam. In my aforesaid application the positions of fulcrum support for the beam are varied by means of a manually controlled member, and it is an object of the present invention to eliminate the necessity of manual control by substituting therefor a simple automatic means for shifting the said fulcrum position of the beam through a control which is governed by the weight of the article placed on the scale.

With these and other objects in view, as will appear as the description proceeds, the invention consists in the novel features of construction, combinations of elements and arrangements of parts hereinafter to be fully described and pointed out in the appended claims.

In the accompanying drawings:

Figure 1 is a vertical sectional view taken through a scale constructed in accordance with the present invention, the fulcrum position of a scale beam being shown in a position adapting the scale to low range weighing operations, Figure 2 is a similar view disclosing the beam of the scale fulcrumed to adapt the scale to high range weighing operations, Figure 3 is a vertical transverse sectional view on the line 3—3 of Figure 1, Figure 4 is a similar view on the line 4—4 of Figure 1, Figure 5 is a vertical sectional view on the line 5—5 of Figure 3, Figure 6 is a transverse sectional view taken through the scale housing showing the automatic means for operating the cam shaft, Figure 7 is a top plan view of the mechanism shown in Figure 6, Figure 8 is a front elevation of the indicating tower, and Figure 9 is a diagrammatic view disclosing the circuit controls for the automatic cam shaft rotating mechanism.

The scale 1 shown in the accompanying drawings comprises a suitable form of housing 2, and in this instance the housing is formed to include in the base portion thereof a beam chamber in which is pivotally mounted a weighing beam or lever 3. At a point substantially midway of its length the beam is pivotally related with the depending stem of a weight support 4. The housing is formed to include an upwardly extending tower 5, terminating at its upper end in a substantially cylindrical casing 6, in which is rotatably mounted an indicating drum or barrel 7 of any suitable design, the said drum rotating about the axis of a supporting shaft 8 carried in connection with the casing 6.

To provide for the pivotal support of the beam, the scale in the simple form of the invention under discussion, is formed to include a base plate or web 9, upon which is mounted a pair of upstanding posts 10 and 11. These posts, as shown in Figure 4, are each provided with vertical slots 12 in which are mounted for travel the ends of transversely extending cross members 13, which have their under medial edges adapted to rest upon the peripheral portions of cams 14 fixed to a longitudinally extending operating shaft 15.

Arising from the ends of the cross members 13 are upwardly extending studs 16, which pass loosely through binding openings 17 formed in connection with the upper ends of the posts 10 and 11. The extreme upper end of the studs 16 are equipped with machined bearing blocks 18 and 19 of agate or steel, which have substantially V shaped recesses 20 provided in the upper surface thereof. These recesses are adapted to receive, in transversely aligned blocks, the knife edge fulcrums 21 and 22 of hardened steel, which project rigidly and in accurately spaced or set order from the sides of the beam 3, so that the fulcrum bearing support will be provided for the beam. It will be observed that the cams 14 are set in opposed relationship on the supporting shaft 15, so that when one cam is in a raised position, as shown in Figure 1, the opposite or complemental cam will occupy a lowered position, see Figure 2. Thus, by the present invention there is provided a plurality of available fulcrum supports, which upon the rotation of the shaft 15, may be moved selectively into supporting relationship with the beam 3, enabling the point of fulcrum support of the beam to be shifted longitudinally of the length of the latter, that is, either toward or away from one end thereof. The particular design of the cams 14 is such that one pair of blocks is always in supporting engagement with the knife edges 21 and 22, so that in no position of adjustment will there be a dropping of the beam to injure the delicate and accurate adjustment of the knife edges. Another feature of the present invention resides in forming the cams 14 so that when the weight of the beam and its supporting part, is transferred from one cam to the other, the beam will occupy a set horizontal position, avoiding the raising and lowering of the pivoted end of the beam and thus maintaining the accuracy of the scale.

In accordance with the present invention the operation of the shaft 15 is effected by an automatic mechanism although, if desired, the outer end of the shaft 15 may be equipped with an operating crank 23, arranged exteriorly of the housing 1 and adapted for emergency use. The shaft 15 is supported for rotation by being journaled at one end in the wall of the housing, while the opposite end thereof is supported by a bearing bracket 24 carried in connection with the plate or web 9.

At a medial point the beam 3 is provided with a third set of knife edges 25, upon which is positioned the downwardly disposed stems 26 of the platter or weight support 4, the stem 26 operating loosely through an opening 27 provided in the top of the housing. In the preferred form of the invention the bearing support 25 between the weight support and the beam occupies a fixed position, and the fulcrum bearings for the beams are shiftable with respect thereto so as to vary the spacing between the point of pivotal support of the platter 4 and the point of pivotal support for the beam 3. The outer end of the beam 3 is pivotally connected as at 28 with the stem 29 of a dash pot 30, used, as ordinarily, in stabilizing the oscillation of the beam 3 and providing an absorbing medium for taking up sudden shocks imparted to the scale.

The extreme outer end of the beam 3 rests upon a stirrup 31 supported by a plurality of vertically arranged springs 32, mounted within the tower 5 and which tend to resist any deflection of the beam from its normal or balanced position, the resistance of the springs increasing, as usual, with the weight applied to the support 4. Also, connected with the outer end of the beam is an upwardly extending rod 33, passing vertically to the tower 5, and having its upper end equipped with a toothed rack 34, arranged for engagement with a pinion 35 mounted on the shaft 8, so that the drum 7 may be rotated, as usual, to indicate weight. The drum is provided with spaced weight graduations 49 and 49'.

The weight support or platter 4 is also provided with a rigidly connected arm 36, the lower horizontal portion of which extends through a slot 37 provided in the tower 5, while the major or vertically extending portions of the arm 36 arises within the tower and has its upper end pivotally connected as at 38 with a horizontally disposed check 39.

The check is provided with a pivotal or fulcrum support which is variable to accord with the spacing between the fulcrums 21 and 22. This is accomplished automatically by providing the interior of the tower 5 with a bracket 40, to which is pivoted as at 41 the central portion of a fulcrum arm 42. The outer ends of this arm are provided with fulcrum pins 43, which are alternately or selectively positionable within one or the other of a pair of recesses 44 provided in the check 39. Pivotally connected as at 45 with the check 39 is a vertically disposed rod 46, which has its lower end connected within the outer portion of a crank 47 fixed to rotate upon the inner end of the shaft 15.

By this construction it will be observed that when the shaft 15 is rotated so as to change the fulcrums 21 and 22 from active to inactive positions, and vice versa, the arm 42 is oscillated by the rotation of the crank 15, resulting as shown in Figures 1 and 2, in the positioning of the pins 43 in one or the other of the recesses 44, so that the effective lengths of the check will accord with the spacing existing between the fulcrums 21 and 22 and the pivotal support 25 of the weight pan. Thus, it will be seen that the beam and the check will maintain the required parallelogram operating position at all times.

In practice, it will be seen that when the scale, as shown in Figure 1, has the parts thereof adjusted for weighing in its "low range" capacity, the beam 3 will be supported at its extreme end position by the fulcrum bearing 22. In this position the weight applied to the support 4 exerts maximum pressure or force on the beam due to the maximum leverage provided and, for example, this arrangement is such that in many commercial types of scales the application of a weight of five pounds will result in rotating the indicator drum 7 to its maximum extent, thus enabling the weight graduations 43 of the drum, employed for low range weighing operations, to be spaced to their maximum extent, as set forth in my aforesaid application, so that ease and facility are to be had in the reading of the scale when in its normal or low range operating condition. Now, if it is desired to increase the weighing capacity of the scale to any desired multiple, for example to double it, it is necessary merely to rotate the shaft 15 by mechanism to be hereinafter described, or through the use of the crank 23. This will move the other set 21 of fulcrum bearing into supporting relationship with the beam, so as to shorten the leverage distance between the point of bearing support of the pan 4 and the beam 3, in this instance reducing it one-half, so that it will take a proportionately greater weight to deflect the beam from its neutral or normal position. This feature of my invention has been specifically set forth and claimed in the aforesaid application, of which the present application constitutes a continuation in part.

When the parts of the scale occupy the positions shown in Figure 2, it is necessary to weight the outer or free end of the beam in order to compensate for the overhanging pivotal end of said beam, in order that the free end of the beam may continue to exercise a uniform action on the spring operated weight indicating mechanism. This may be conveniently accomplished as shown especially in Figure 3, by providing the shaft 15 with a cam 50 which engages a transverse cross member 51, the later having its end mounted within slots 52 provided in upright posts 53. The cross member 51 is formed with a conical socket 54 adapted for the reception of a conical projection 55 provided upon a weight 56 of a supplemental or reserve character. The weight 56 is formed to provide upstanding arms 57, provided with vertical slots 58 in which are received transversely extending rigid knife edge projections 59 carried by the beam or lever 3.

In operation, when the scale parts, as shown in Figure 1, are disposed for the so called low range operation, the cam 50 is elevated so as to raise the weight 56 and relieve the lever 3 of its influence, allowing said levers to vibrate without permitting the projections 53 thereof to contact with the end of the slots 58. However, when the scale is adapted for high range operation, and the fulcrum support of the beam is shifted, as shown in Figure 2, the rotation of the shaft 15 lowers the cam 50 and removes the support for the weight 56, allowing the latter to descend and to rest upon the knife edge projections 59, or in other words, the weight 56 is then supported by the scale beam, in order that the latter will be automatically corrected and its action on the indicating mechanism rendered uniform regardless of the presence of the overhanging pivotal end of the beam.

Another outstanding feature of the invention resides in the provision of the automatic means for controlling the rotation of the shaft 15. This is accomplished in the present instance by the provision of a pinion 60, fixed upon the operating shaft 15. This pinion engages with a horizontally disposed rack 61, constituting a part of the core of a solenoid 62, located in the base of the housing. When a commodity of sufficient weight is applied to the pan 4 so as to cause the beam to move to its extreme lowered position, said beam will at this point engage a switch 63 closing an electrical circuit 64 in which the solenoid 62 is situated. By exciting the coil of the solenoid 62 the rack 61 is reciprocated against the influence of a spring 65, causing the rotation of the pinion 60 and the corresponding rotation of the operating shaft 15. This, as previously explained, results in the shifting of the fulcrum support for the beam. In order to retain the part in this position the rack 61 is provided with an opening 66, which is engaged by the spring pressed core 67 of a second solenoid 68, whereby when the rack 61 is reciprocated to an extent sufficient to effect the shifting of the beam fulcrums, the core 67 is pressed by its spring into engagement with the opening 66 so as to retain the rack in its set position against the influence of the spring 65. This enables the commodity placed on the pan, if such commodity be within the so called high range, to be completely weighed but when said commodity has been removed from the pan, the beam moves upwardly and before reaching its extreme position of upward movement engages with a switch 69, closing a second circuit in which the solenoid 68 is situated. The exciting of the solenoid 68 withdraws the core 67 from the opening 66, and allows the rack 61 to return to its normal position under the influence of the spring 65. By this simple arrangement it will be observed that the operation of shifting the fulcrum support for the beam is capable of being accomplished automatically in response to the weight supplied to the scale, eliminating the necessity of operating a hand controlled part in order to change the capacities of the scale.

In view of the foregoing it will be seen that the present invention provides first; an improved arrangement for automatically shifting the fulcrum support of the beam to adapt the scale to any one of a plurality of weighing positions; second, the position of a reserve weight for balancing the beam and to correct the same to overcome the unbalancing condition produced by the shifting of the fulcrum support, and third, the invention provides a means for maintaining the position of the beam with respect to the horizontal level during the operation of transferring the weight of the beam from one fulcrum support to another. It is in these particulars essentially that the present invention constitutes an improvement upon the broad disclosures contained in the aforesaid application.

What is claimed is:

1. In a scale, a beam, pivotal supports for the beam, a pivotal support between the beam and weight receiver, means to maintain the pivotal supports of said beam in any one of a plurality of favorably spaced positions, a weight indicating mechanism connected with said beam, and automatic compensating mechanism operating in connection with said beam for causing the latter to exert a uniform influence on said weight indicating mechanism throughout all positions of pivotal support of said beam.

2. In a scale, a beam, pivotal supports for said beam, a weight receiver, a pivotal support between the receiver and beam, means admitting of variation in the relative spacing of the supports of said beam, a weight indicating mechanism connected with said beam, and compensating mechanism cooperative with said beam and said means for causing the beam to exercise a uniform action on said weight indicating mechanism irrespectively of the point of pivotal support of said beam.

3. In a scale, a weighing beam, a weight receiver on said beam, shiftable fulcrum supports for said beam, means resisting deflection of said beam from a normal position, and automatic compensating means cooperative with said beam for causing the latter to exercise a uniform action on said first named means.

4. In a scale, a weighing beam, a weight receiver on said beam, fulcrum supports for said beam, means yieldingly resisting movement of said beam from a normal position, an indicator mechanism movable proportionately to the movement of said beam from its normal position, means permitting of variation in the working position of the fulcrum supports with respect to said beam, and automatic means cooperating with said beam for preserving the balance of said beam irrespective of the working position of the fulcrum support therefor.

5. In a scale, a weighing beam, pivotal supports for said beam, a check, pivotal supports for said check, means for simultaneously shifting the operating positions of said support with respect to said beam and check, and automatically operating means for preserving the operative balance of said beam in all positions of adjustment of said support.

6. In a scale, a weighing beam, a pair of pivotal supports, means for selectively engaging one or the other of said supports with said beam to vary the point of pivotal mounting of the beam, a weight indicating mechanism operatively connected with said beam, and automatically operating means for preserving the normal load which said beam exercises on said weight indicating mechanism irrespective of the shifting of said fulcrums.

7. In a scale, a weighing beam, an indicating mechanism connected with said beam, shiftable fulcrum supports for said beam, and means operable simultaneously with the shifting of said fulcrum supports to weight or unweight said beam so as to cause the latter to exercise a uniform action on said weighing mechanism independently of the point of fulcrum support of said beam.

8. In a scale, a weighing beam, a plurality of fulcrum bearings for said beam, and means operable upon the application of predetermined weight to said beam for selectively engaging said bearings with said beam.

9. In a scale, a weighing beam, a weight receiver pivotally supported by said beam, fulcrum supports for said beam, and automatically operating means for varying the operative positions of said fulcrum supports with respect to said beam upon the application of varying weights to said beam.

10. In a scale, a weighing beam, shiftable fulcrum supports for said beam, and means operable automatically for shifting said supports in response to varying loads applied to said beam.

In testimony whereof I affix my signature.

NATHAN A. HALLWOOD.